July 28, 1936.　　　　E. FINSEN　　　　2,048,690
MACHINE FOR PRODUCING GEARS
Filed April 6, 1932　　　11 Sheets-Sheet 1

INVENTOR
Eyvind Finsen
BY
his ATTORNEY

July 28, 1936. E. FINSEN 2,048,690
MACHINE FOR PRODUCING GEARS
Filed April 6, 1932 11 Sheets-Sheet 3

INVENTOR
Eyvind Finsen
BY
his ATTORNEY

July 28, 1936.　　　　　E. FINSEN　　　　　2,048,690
MACHINE FOR PRODUCING GEARS
Filed April 6, 1932　　　11 Sheets-Sheet 5

INVENTOR
Eyvind Finsen
BY
his ATTORNEY

July 28, 1936.  E. FINSEN  2,048,690

MACHINE FOR PRODUCING GEARS

Filed April 6, 1932  11 Sheets-Sheet 6

INVENTOR
Eyvind Finsen
BY Schlesinger
his ATTORNEY

July 28, 1936.   E. FINSEN   2,048,690
MACHINE FOR PRODUCING GEARS
Filed April 6, 1932   11 Sheets-Sheet 7

INVENTOR
Eyvind Finsen
BY B. Schlesinger
his ATTORNEY

July 28, 1936.  E. FINSEN  2,048,690

MACHINE FOR PRODUCING GEARS

Filed April 6, 1932   11 Sheets-Sheet 8

INVENTOR
Eyvind Finsen
BY
his ATTORNEY

July 28, 1936.  E. FINSEN  2,048,690
MACHINE FOR PRODUCING GEARS
Filed April 6, 1932  11 Sheets-Sheet 9

INVENTOR
Eyvind Finsen
BY
his ATTORNEY

July 28, 1936.  E. FINSEN  2,048,690
MACHINE FOR PRODUCING GEARS
Filed April 6, 1932  11 Sheets-Sheet 10

INVENTOR
Eyvind Finsen
BY
his ATTORNEY

July 28, 1936. E. FINSEN 2,048,690
MACHINE FOR PRODUCING GEARS
Filed April 6, 1932 11 Sheets-Sheet 11

INVENTOR
Eyvind Finsen
BY
his ATTORNEY

Patented July 28, 1936

2,048,690

UNITED STATES PATENT OFFICE 2,048,690

MACHINE FOR PRODUCING GEARS

Eyvind Finsen, Rochester, N. Y., assignor to Gleason Works, Rochester, N. Y., a corporation of New York Application April 6, 1932, Serial No. 603,541

14 Claims. (Cl. 51—52)

The present invention relates to machines for producing gears and particularly to machines for generating bevel gears. In a still more specific aspect, the invention relates to machines for grinding straight beveled gears.

For years, machines have been used for generating bevel gears in which the generating roll is produced by oscillation of a cradle upon which the work or tool mechanism is mounted and by simultaneous rotation of the work through operation of a pair of segments, one of which is connected to the work spindle and the other of which has a fixed relation to the tool mechanism. These machines have had the advantage of extreme simplicity in construction, and, therefore, of low cost. As built, heretofore, however, they have been suitable only for production work where the quantity of gears to be cut was sufficiently large to allow the machine to be operated indefinitely on one particular job, for, in these machines, change of a job has meant change of the cams for producing the feed and generating motions and either change requires time; moreover, the cams are expensive.

One object of the present invention is to provide a machine which, while preserving the characteristic simplicity of the prior machines referred to, will be capable of more nearly universal use. To this end, it is a purpose of the invention to provide a machine in which the amount of feed movement is capable of infinite variation within the range of the machine and in which the amount and rate of the generating roll is also infinitely variable within the range of the machine.

Another object of the invention is to provide a machine of the character described and employing reciprocating tools which will be faster in operation than machines of this type heretofore built.

A further object of the invention is to provide a gear generating machine of the character described in which the index mechanism is operated by the roll of the cradle and in which the mechanisms for effecting the generating roll and the relative movements of alternate feed and withdrawal between the tool and blank are interlocked so that the generating roll does not begin until the tool mechanism is in operative position and the return roll for indexing does not commence until the tool mechanism is in withdrawn or inoperative position.

Another object of the invention is to provide a gear generating machine in which uniform and steady operation of the various moving parts may be obtained to the end that a smoother and better finish may be secured on the tooth surfaces of the gears to be generated.

Still another object of the invention is to provide a gear generating machine in which the generating roll and the relative movements between the tool and blank for alternate feed and withdrawal are hydraulically operated and interlocked.

A further object of the invention is to provide a gear generating machine in which the rate of generating and return rolls of the cradle can be separately varied at will and each within very wide limits.

Another object of the invention is to provide a gear generating machine employing reciprocating tools for producing the lengthwise tooth shape, in which provision is made for adjusting the tool mechanism and blank relative to one another so as to produce a relative rolling motion on the pitch line between the tool mechanism and the blank and thereby produce gears truly conjugate to a true crown gear.

Another object of the invention is to provide a generating machine of the indexing type in which the mechanism for producing the alternate movements of feed and withdrawal between the tool and blank for alternate cutting and indexing is employed, also, to effect relative separation of the tool and blank to inoperative position after the gear has been completed and in which this mechanism, for the purpose of this last named movement, is under the control of a manually-operable trip device.

Still another object of the invention is to provide a practical and efficient type of machine for grinding straight bevel gears at high speed and in which a pair of rotating grinding wheels may be employed to grind two tooth surfaces of a gear simultaneously by reciprocation of the rotating wheels in converging paths across the face of the gear.

The invention includes, also, various other improvements and refinements as will appear hereinafter from the specification and from the recital of the appended claims.

In the drawings:

Figure 15 is a section on the line 15—15 of Figure 11;

Figure 1:
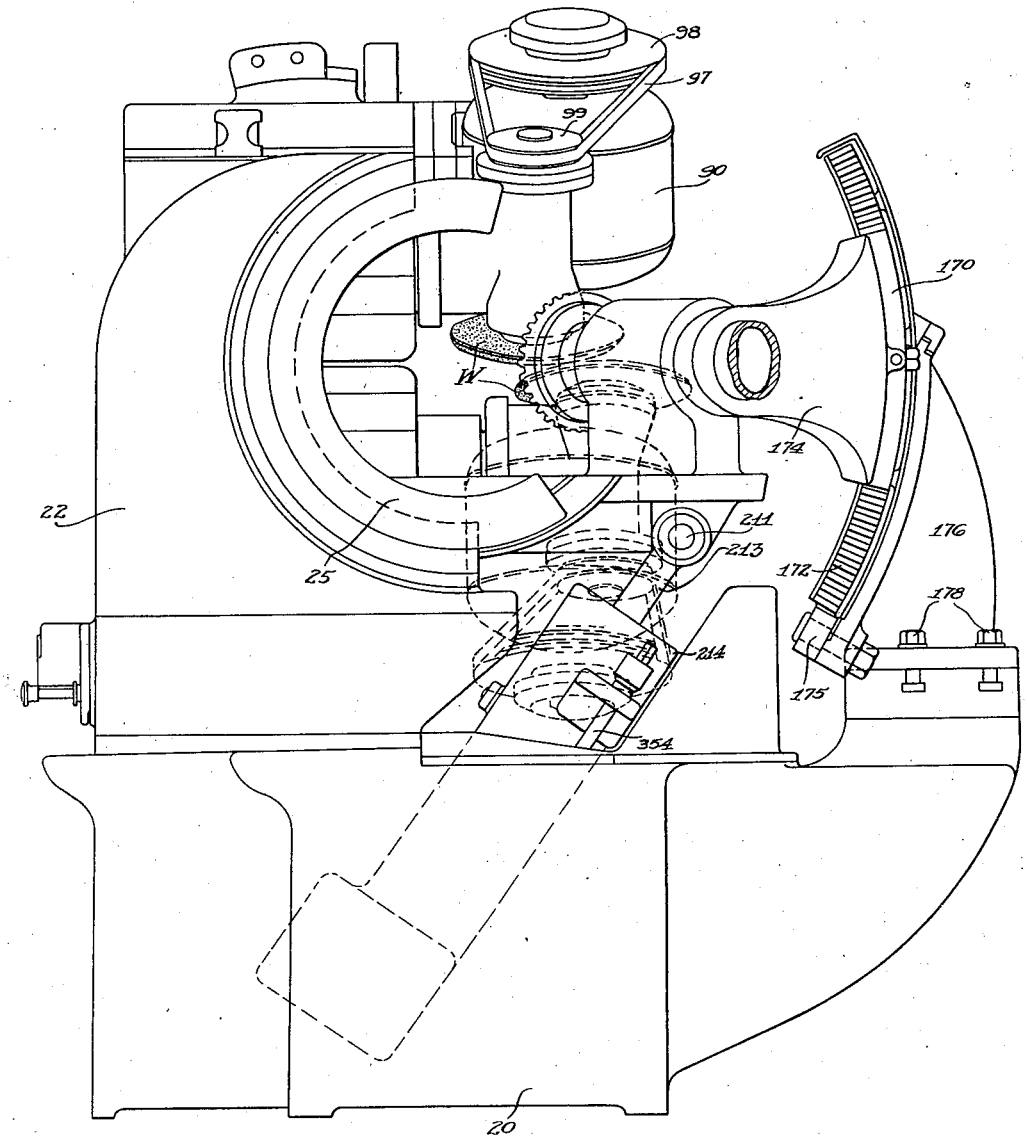
Figure 1 is an end elevation of a straight bevel gear grinder built according to a preferred embodiment of this invention, the view being taken looking at the work end of the machine.

While capable of various applications, the invention has been illustrated in connection with a straight bevel gear grinder of the generating type. In this machine, a pair of grinding wheels are provided to grind simultaneously opposite side tooth surfaces of the gear. The grinding wheels are rotatably mounted on a pair of slides that are reciprocated simultaneously in opposite directions. The slides are mounted to slide on ball bearings in ways formed in the tool arms. The anti-friction mountings of the slides, a novel feature of the present machine, permit of reciprocating the same at very high speed and yet with a smoothness heretofore unattainable. The latter result is a very important factor in making it possible to secure a better ground tooth surface finish, while the higher speed of operation appreciably reduces production costs.

The tool arms are mounted on a column or upright and, as usual, are adjustable thereon about a common center to position the wheels for movement in the converging paths determined by the lengthwise convergence of the tooth surfaces of the bevel gear to be ground. The tooth surfaces of the gears are ground with conical operating surfaces of the grinding wheels.

Each wheel is driven by a motor mounted directly on its tool arm. The slides are driven by a crank so that reversal takes place without shock or jar. A single crank operates both slides, being connected to the two slides through an oscillatory plate or arm. The wheels are adjustable on their respective slides to compensate for wear. The upright or column which carries the tool mechanism is mounted on a supporting plate and is adjustable laterally on this plate so that gears of different cone distances can be ground. The supporting plate is mounted on a reciprocable bed or carriage which is slidable on the base or frame of the machine.

A unique feature of the present machine is the provision made for adjusting the grinding wheels so as to grind gears fully conjugate to a true crown gear. To this end, the supporting plate is mounted to be adjustable angularly on the sliding bed or carriage so that the tip surfaces of the grinding wheels can be positioned to travel in a plane inclined to the axis of the cradle at an angle equal to the dedendum angle of the gear to be ground. Thus, the wheels, in their motion, will represent tooth surfaces of a true crown gear and grind tooth surfaces on the bevel gear fully conjugate to such a crown gear. This eliminates any error in tooth profile curvature arising from generation, as in prior practice, conjugate to a nominal crown gear.

The sliding bed or carriage is reciprocable on the frame of the machine to effect alternate feed and withdrawal movements of the grinding wheels relative to the gear being ground. The alternate feed and withdrawal motions have the usual purposes, respectively, namely, of permitting grinding the tooth profiles to their full depth and then clearing the wheels from the work to permit indexing.

In the machine illustrated, the generating roll is imparted wholly to the work, there being a segment connected to the work spindle which meshes with a relatively fixed crown gear segment and the work spindle being journaled in a head that is mounted on the oscillatory cradle. The usual adjustments of the work for cone distance and pitch angle are provided.

One of the principal features of the present machine consists in hydraulic operation of the cradle and carriage. As regards the cradle, this means a steadier, more uniform operation and results in an improved tooth surface finish. A higher rate of production is also attainable through use of the hydraulic operating mechanism, for both the roll of the cradle and the feed of the bed can be varied within practically infinite limits with the result that just the right amount of roll and the right amount of feed can be employed on a given job and any loss of time avoided.

The cradle oscillation is effected through reciprocation of a piston which is connected at one end to the cradle, and the alternate feed and withdrawal movements of the wheels are produced by reciprocation of a piston which is connected at one end to the sliding bed or carriage. Through a unique valve mechanism, the movement of the two pistons are interlocked so that they operate alternately. Thus, the wheels are first fed into depth, then the cradle is rocked in one direction to roll the work past the wheels, then the wheels are withdrawn from engagement with the work and then the cradle is returned to the initial position. The indexing mechanism employed on the machine is of a type which is tripped by the roll of the cradle and it is intended that this mechanism be tripped on the return roll of the cradle when the wheels are clear of the work. The interlocking of the cradle and bed operating mechanisms is another feature making it possible to obtain higher production on this machine than on machines of previous construction. Only that amount of roll need be used which is actually required to roll out the tooth profiles. The interlocking of the two mechanisms is a safety feature, also, preventing absolutely any possibility of indexing taking place while the grinding wheels are in operative position.

Separate valves are provided to control the rates of roll of the cradle in opposite directions so that a high speed return can be obtained without sacrificing the slow generating roll required to secure that smoothness of tooth profile finish which is sought in ground gears.

Once the machine is started, its operation is automatic, the parts performing their functions in proper sequence until the gear is completely ground. Then an automatic stop device is tripped to cause a valve to be shifted to close off the pressure line to the cradle piston, thus stopping the cradle movements.

The distance to which the wheels are withdrawn periodically for indexing is limited by a movable stop-dog. Normally this stop-dog is held in operative position by a spring-pressed plunger. To take off the completed gear and chuck a new blank greater clearance between the wheels and the work is ordinarily desirable. This can be obtained by releasing the spring-pressed plunger referred to and allowing the piston that controls the bed-movement to bottom in its cylinder, thereby withdrawing the wheels entirely clear of the work.

No dressing mechanism has been shown for dressing the grinding wheels, and they may be dressed by hand or through use of any suitable type of dressing mechanism.

The operation of the machine and its principal features of improvement have been described generally. Reference will now be had to the accompanying drawings for a more detailed description thereof.

Figure 9:
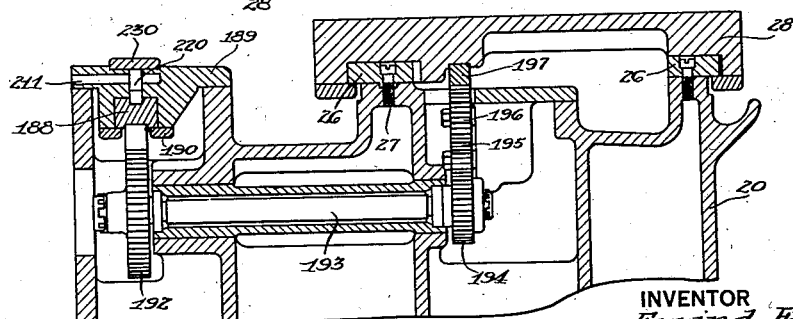
Figure 9 is a fragmentary vertical sectional view through the frame of the machine, the section being taken substantially on the line 9—9 of Figure 3 and looking in the direction of the arrows.

20 designates the base or frame of the machine. At one end of the base, there is provided an upright portion 22 which is formed with arcuate ways 23 and 24 (Fig. 2) in which the cradle 25 oscillates. The base is, also, provided with ways 26 which extend in a direction parallel to the axis of the cradle 25. These ways 26 may be hardened and ground and secured to the base 20 by screws 27, as shown in Figure 9. 28 designates a bed or carriage that is mounted on the base 20 of the machine and is slidable on the ways 26. The tool mechanism is mounted on the bed 28 while the support for the work is secured to the cradle. The tool end of the machine will be described first.

Figure 3:
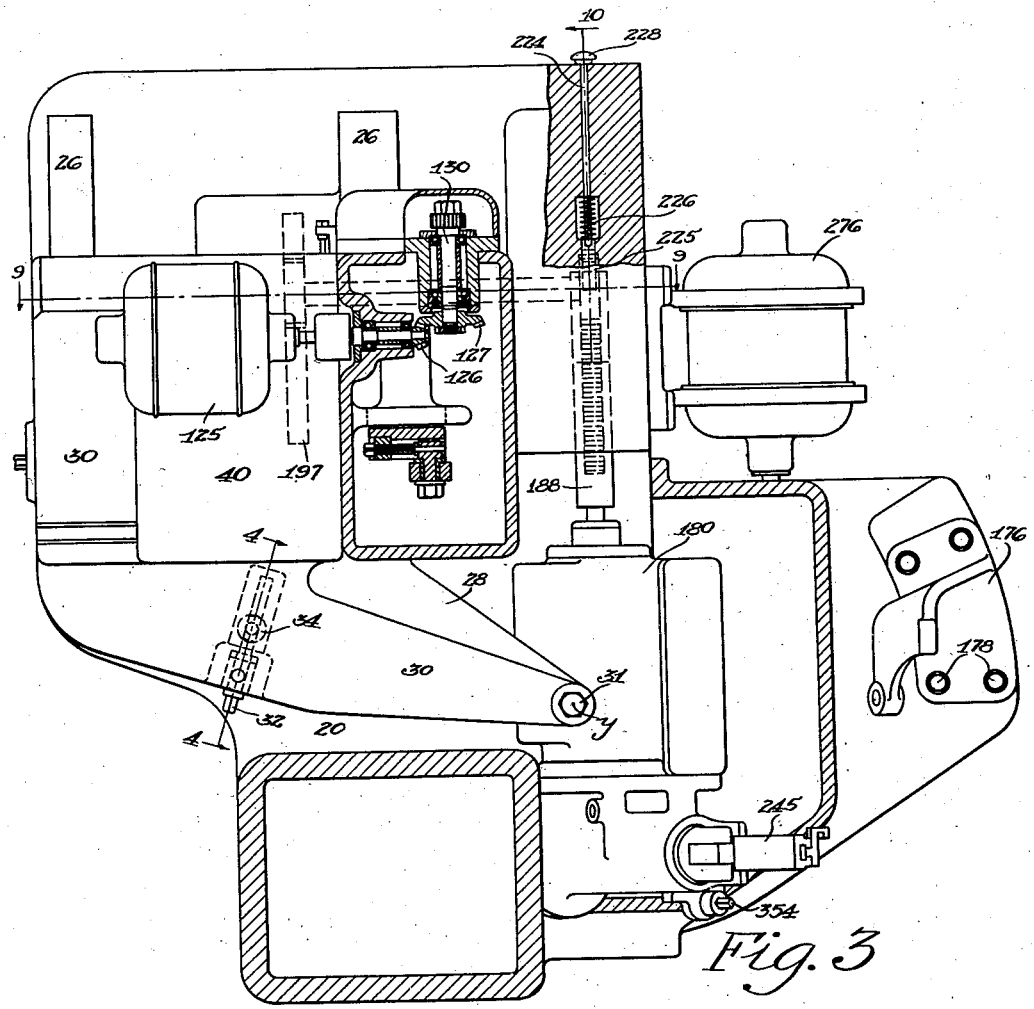
Figure 3 is also a plan view, but with the cradle and tool mechanism removed to show other constructional details of the machine.
Figure 4:
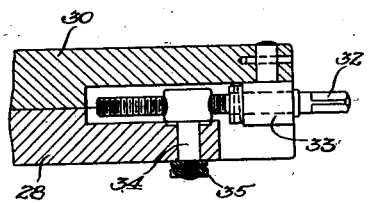
Figure 4 is a section on the line 4—4 of Figure 3.
Figure 5:
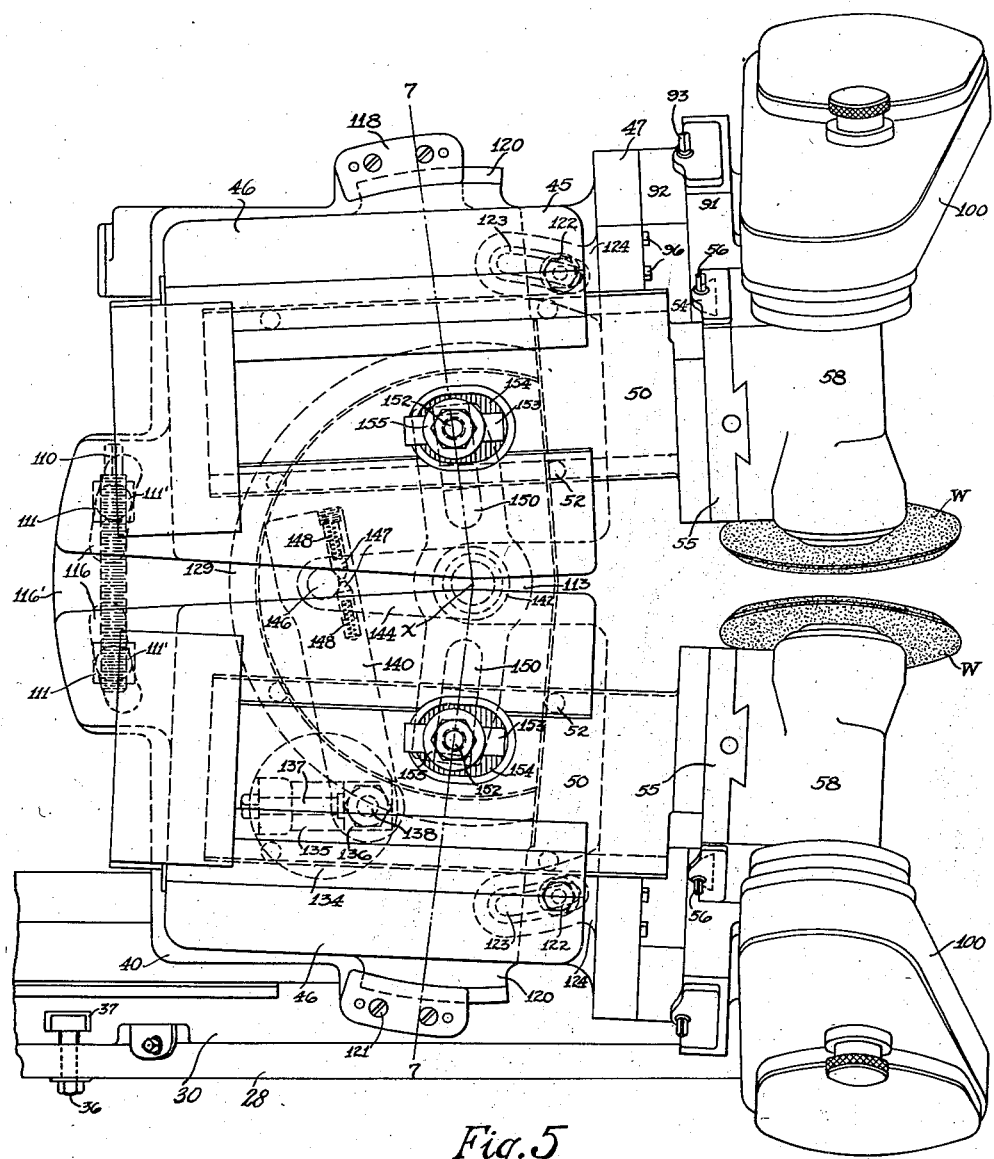
Figure 5 is an end elevation of the tool mechanism of the machine.
Figures 6, 8:
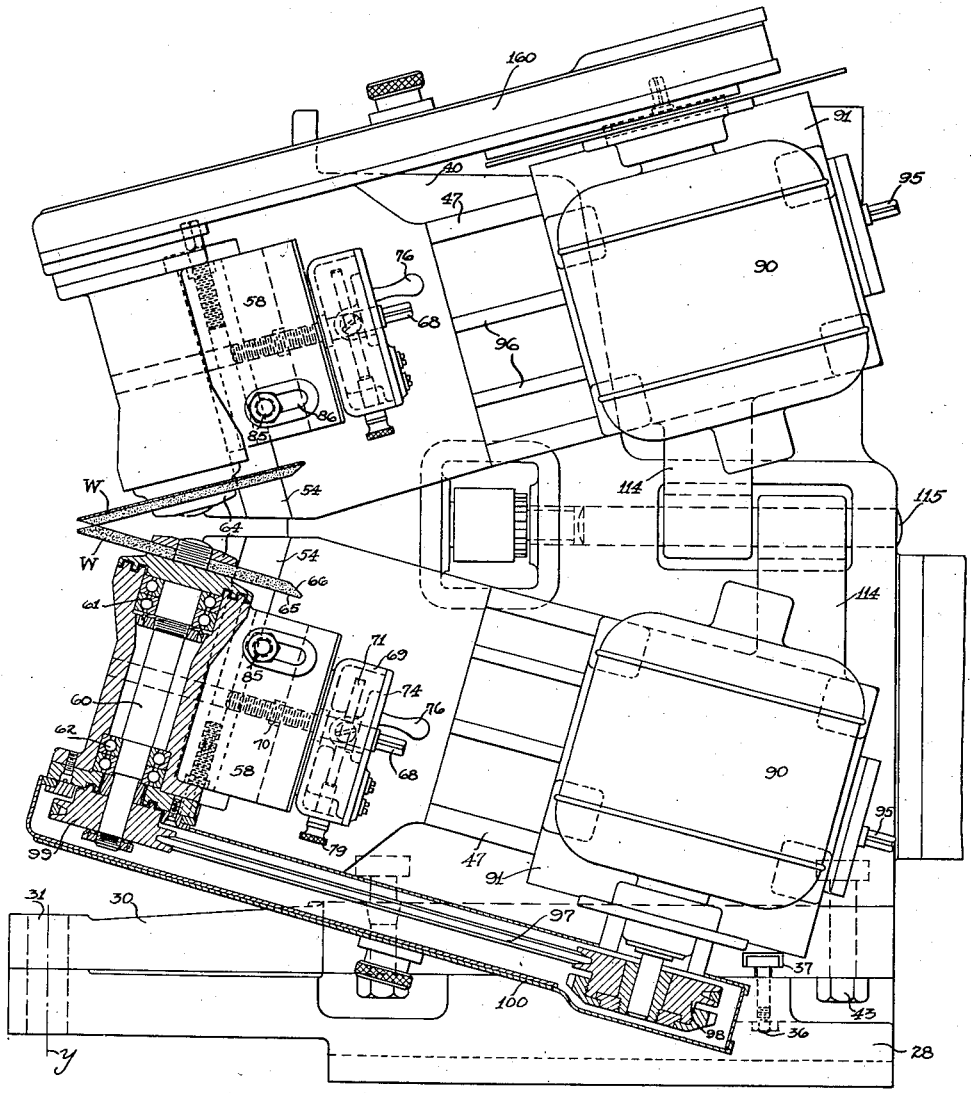
Figure 6 is a view at right angles to Figure 5; parts being shown in section.
Figure 8 is a view on an enlarged scale showing details of the mechanism controlling the feed of the grinding wheel to compensate for wear.
Figure 7:
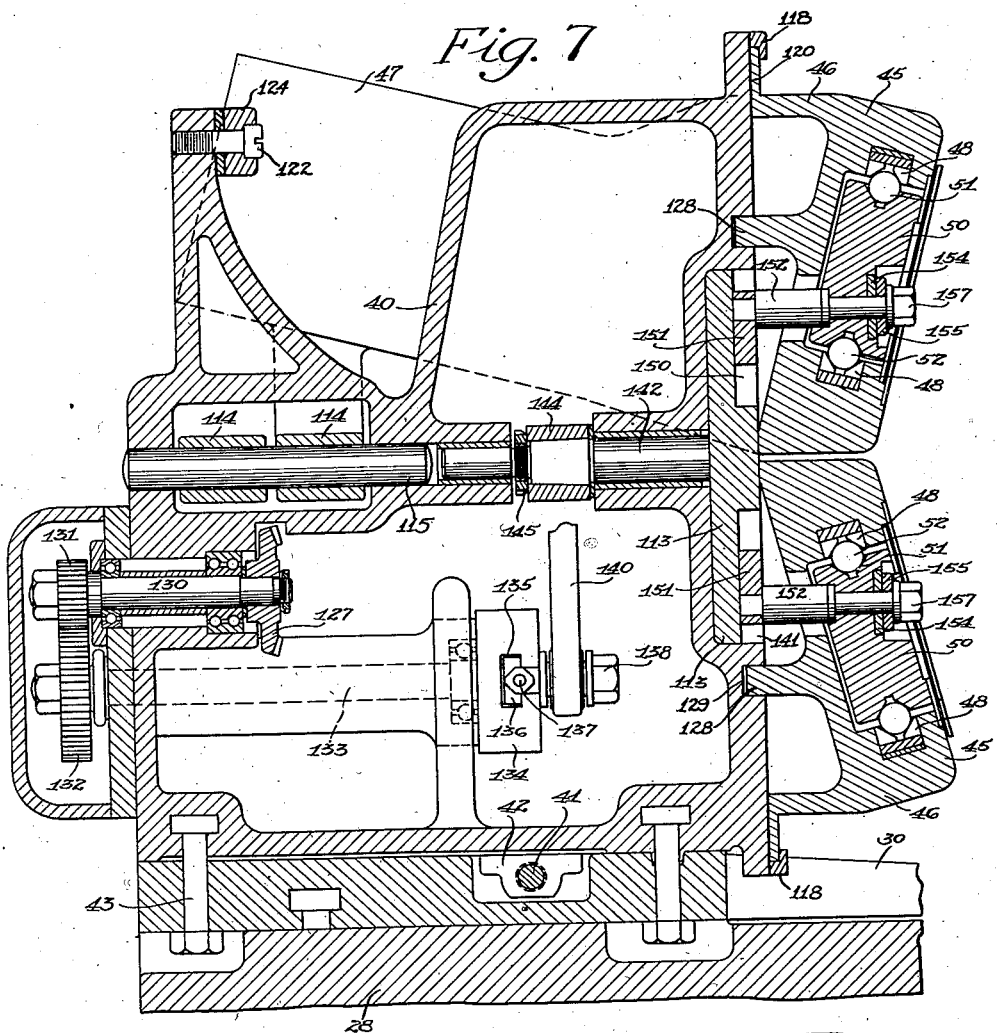
Figure 7 is a section on the line 7—7 of Figure 5.

Mounted on the bed or carriage 28 for angular adjustment thereon is a supporting plate 30 (Figs. 3, 6 and 7). This plate adjusts about a pivot pin 31 whose axis intersects the axis of the cradle. Adjustment of the plate 30 upon the carriage 28 is effected by rotation of the screw shaft 32 (Fig. 4). This shaft is journaled in a headed member 33, which swivels in the plate 30, and it is threaded into the head of a stud 34 that swivels in the bed 28. The stud 34 is secured to the bed 28 by the nut 35 which threads onto the stem of the stud. The supporting plate 30 is secured in any position of its angular adjustment about the axis y of the head 31 by T-bolts 36 (Figs. 5 and 6), which are secured in the bed 28 and have their heads in engagement with an arcuate T-slot 37 formed in the under surface of the plate 30 and curved about the axis of the pin 31 as a center.

There is an upright or column 40 (Fig. 7) mounted on the plate 30 and adjustable laterally thereon. Adjustment of this column on the plate 30 is effected by rotation of the screw-shaft 41, which is rotatably mounted in the plate 30 and which threads into the nut 42 carried by the column. The column is secured in any adjusted position by the T-bolts 43 which are secured in the plate 30 and have their heads in engagement with T-slots formed in the under-face of the column.

There are a pair of tool arms 45 mounted on the column 40 and adjustable angularly thereon about an axis x which is offset from but parallel to the axis of the cradle (Fig. 5). Each of the tool arms 45 is approximately right-angular in shape. One leg 46 of each tool arm (Figs 5 and 7) rests against one end face of the column 40. The other leg 47 of each tool arm extends at one side of the column 40 rearwardly from the leg 46.

The front leg 46 of each tool arm is grooved longitudinally to receive a pair of hardened V-shaped ways 48 (Fig. 7). The grooves in which these ways seat are so cut in each arm 45 that each pair of ways is inclined to the end face of the column 40. This inclination is sufficient to let the grinding wheels pass one another in their strokes across the face of the gear. There are a pair of tool slides 50 mounted to reciprocate on the tool arms. These slides are formed with V-shaped grooves 51 at opposite sides and these grooves are adapted to cooperate with the hardened V-shaped ways 48 to receive the balls 52 which form an anti-friction mounting for the slides 50, enabling the slides to be operated at high speeds.

Figure 2:
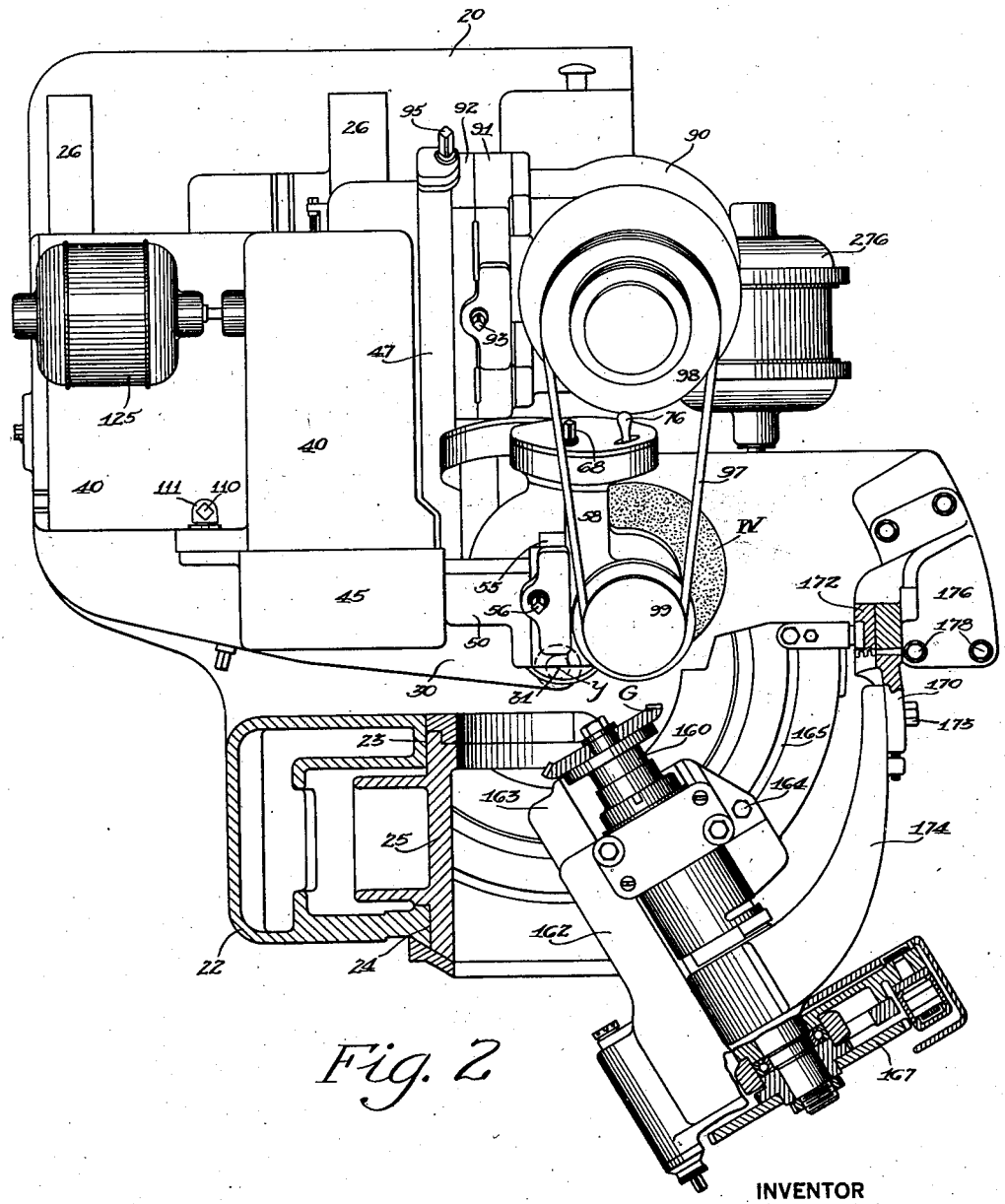
Figure 2 is a plan view of this machine, parts being broken away to show the construction.

Each of the slides 50 is formed at one end with a dove-tailed guide 54 (Figs. 2, 5 and 6). Each guide extends from top to bottom of its slide and is inclined to the front face of the column in parallelism to the corresponding ways 48. There is a block 55 slidable on each way 54 and adjustable thereon by means of a screw shaft 56. There is a wheel head 58 mounted on each of the blocks 55. Each of these wheel heads is adjustable on its block in a direction at right angles to the direction of adjustment of the block on the associated guide 54.

The two grinding wheel spindles 60 are journaled on spaced anti-friction bearings 61 and 62 in the wheel heads 58. The grinding wheels W are secured to the two spindles 60 by nuts 64. Each wheel has a plane face 65 and a conical operating surface 66. Opposite side tooth surfaces of the gear to be ground are ground by the conical operating surfaces of the two wheels.

Adjustment of the blocks 55 on the guides 54 is for the purpose of spacing the operating surfaces of the wheels apart in accordance with the tooth thickness of the gears to be ground. The two wheels operate preferably on opposite sides of the same tooth. Adjustment of the heads 58 on the blocks 55 is for the purpose of compensating for wear of the wheels. This latter adjustment is effected by rotation of the screw shafts 68 (Figs. 6 and 8).

Each screw shaft 68 is journaled in a guard 69 that is secured in any suitable manner to the associated wheel head 58. Each screw shaft threads into a lug 70 formed integral with the associated block 55. There is a ratchet wheel 71 keyed to each screw shaft 68 within the guard or housing 69. Rotatably mounted on each screw shaft 68 is an arm 72. Mounted in the free end of each arm 72 is a spring-pressed plunger 73 whose inner end is shaped as a pawl to engage the teeth of the associated ratchet wheel 71. Each guard or housing 69 is closed by a cover-plate 74 that is secured in position by screws 75. There is a handle 76 secured to each of the arms 72 and each handle extends outwardly through an arcuate slot 77 formed in the associated cover-plate 74. The slots 77 are curved about the axes of the screw-shafts 68. By grasping the handles 76 and rotating the arms 72, the operator can feed the grinding wheels forward step by step.

Spring-pressed stop-dogs 78 are mounted in each housing 69 to hold the ratchet wheels 71 against backward movement. These dogs can be disengaged by pulling out on the knurled knobs 79 which are pinned to the dogs. The amount of adjustment of the wheel head 58 for each movement of the handles 76 is determined by the setting of a deflector 80. There is one of these deflectors 80 mounted in each of the housings 69 in proximity to the ratchet wheels and the deflectors are adjustable about the axis of the screw shaft 68 to govern the amount of feed on each movement of the handle 76. Each deflector is held in its adjusted position by screws 81 which pass through an arcuate slot 82 formed in the deflector and which thread into the associated housing 69. The slots 82 are curved about the axes of the respective screw shafts 68. The wheel heads 58 are secured in any adjusted position by bolts 85 which pass through slots 86 in the respective wheel heads and thread into the associated blocks 55.

The two grinding wheels are driven by separate motors 90. These motors are secured to blocks 91 that are adjustable rectilinearly on plates 92, the adjustment of the blocks 91 on the plates 92 being effected, in each case, by rotation of a screw shaft 93 that is journaled in a block 91 and threads into a plate 92. Each of the plates 92 is adjustably mounted on the leg 47 of one of the tool arms 45. Adjustment of each plate 92 on the associated tool arm is in a direction at right angles to the direction of adjustment of the block 91 on the corresponding plate 92. Adjustment of the plates 92 is effected by rotation of the screw-shafts 95 which are journaled in the tool arms 45 and which thread into the plates 92. In their adjustments, the respective plates 92 move on ways 96 formed on the outer faces of the sides 47 of the tool arms 45 and extending parallel to the direction of adjustment of the associated wheel heads 58.

The two grinding wheels W are driven from their respective motors 90 by belts 97 which connect the pulleys 98, that are secured to the armature shafts of the respective motors, with the pulleys 99 that are keyed to the respective wheel spindles 60. Telescoping guards 100 encase the pulleys and belts. The two right angular adjustments of the motors 90 make it possible to hold the pulleys 98 and 99 of each drive in alignment in any adjusted position of the associated grinding wheel head 58.

The two tool arms 45 are adjustable angularly about the axis $x$ to adjust the angle of convergence of the paths of reciprocating movement of the wheels in accordance with the angle of lengthwise convergence of the tooth surfaces to be ground. This adjustment is effected by rotation of the screw-shaft 110 (Fig. 5) which threads into two heads 111 that are swivelly connected to studs 111' which pass through arcuate slots 116 in the flange 116' of the column 40 and which thread into the tool arms 45. The sides 47 of the tool arms are provided with lugs 114 (Figs. 6 and 7) which are journaled on the cylindrical bar 115 and which rock on this bar during the described angular adjustment of the tool arms. The bar 115 is mounted in the upright 40 with its axis coinciding with the axis $x$ about which angular adjustment of the arms takes place. The arms 45 are also held on the column 40 by the gibs or straps 118. These straps 118 engage over lugs 120 formed integral with the respective tool arms and are secured to the column 40 by screws 121. To further rigidly secure each arm 45 against movement, after it has been adjusted, there is a lug 124 (Figs. 5 and 7) formed integral with the leg 47 of each tool arm and extending from the rear side of said leg. Each of these lugs is provided with a slot 123 that is curved about the axis $x$ as a center. Bolts 122 are passed through each of these slots and threaded into the column 40, thereby further securing the arms against movement after adjustment. Each of the tool arms 45 is provided with an arcuate tongue 128 (Figs. 5 and 7) that engages in an arcuate slot 129 in the face of the column 40, thereby to guide the arms in their adjustment on the column. The slot 129 is curved about the axis $x$ as a center.

The tool slides 50 are driven from the motor 125 (Figs. 2 and 3) that is mounted upon the column 40. There is a bevel pinion 126 connected to the armature shaft of this motor. This pinion meshes with a bevel gear 127 that is secured to a shaft 130 (Figs. 3 and 7) which is journaled in the column 40. There is a spur gear 131 secured to the shaft 130. This meshes with a spur gear 132 which is secured to a shaft 133 that is also journaled in the column 40. The inner end of the shaft 133 is enlarged to form a crank-plate 134 (Figs. 5 and 7). There is a diametrical slot 135 extending across the crank-plate and in this slot is mounted a block 136 which is adjustable therein by means of the screw 137. The block 136 carries the crank-pin or bolt 138. This crank pin or bolt serves to connect the crank arm 140 with the crank-plate.

The actuating member 113 is mounted for oscillation in a recess 141 formed in the front face of the column 40. There is a shaft 142 formed integral with the actuating member 113 and extending rearwardly from the same. This shaft 142 is journaled in the column 40 with its axis coinciding with the axis $x$. There is an arm 144 keyed to the shaft 142 and held against axial movement thereon by the nut 145. There is a stud 146 mounted in the free end of this arm. There are a pair of opposed spring-pressed plungers 147 mounted in the free end of the crank arm 140. These plungers are adapted to engage the stud 146 to connect the crank arm 140 to the arm 144. The crank arm 140 can be readily disconnected from the arm 144, however, by holding the arm 144 stationary and pulling the arm 140 away from the arm 144. The outer ends of the plungers 147 are tapered so that when this is done, they will be forced apart readily. The plungers are normally held in engaging positions by the springs 148.

The actuating member 113 is a double-armed member of a shape clearly shown in Figure 5. Each arm of this member is furcated to provide a slot 150. There is a block 151 mounted in each of the slots 150. Each of the blocks 151 is connected to one of the tool slides 50 by a pin 152. The pins 152 pass through aligned slots 153 which are formed in each of the tool slides and in oval plates 154 that are seated in appropriately shaped recesses in these slides. A nut 157 and washer 155 (Figs. 5 and 6) serves to secure each tool slide in any adjusted position relative to the actuating pin 152. The rear faces of the washers 155 are serrated to engage correspondingly serrated front faces of the plate 154, thereby the more firmly to connect the pins 152 and slides 50 together when the nuts 157 are tightened up.

Through the mechanism just described, the slides 50 are reciprocated simultaneously in opposite directions to cause the grinding wheels to grind the opposite side tooth surfaces of the gear. The work is mounted upon the cradle 25 in a manner similar to that heretofore employed in gear generating machines of the segment-roll type, but will be briefly described here.

The gear to be ground G is secured by any suitable chucking mechanism on a work spindle 160 (Fig. 2) that is journaled in the work head 162. For gears of different cone distances, the work spindle may be made directly adjustable in an axial direction in the work head or the work head itself may be mounted on the work head carrier for adjustment in a direction axial of the work spindle. For gears of different pitch cone angles, the work head carrier 163 is adjustable angularly on the cradle. The work head carrier is secured in any adjusted position by T-bolts 164 whose heads engage in an arcuate T-slot 165. When the carriage 28 is in full depth position, the axis $y$ of the pin 31 passes through the center of the slot 165.

The indexing mechanism may be of any suitable construction but preferably will be of the notched-plate type and operated by the roll of the cradle, such an indexing mechanism being shown, for instance, in the U. S. patent of E. W. Bullock et al. No. 1,679,809 of August 7, 1928. In the drawings of the present application, 167 designates the notched plate of such an index mechanism.

To grind the tooth profiles of a generated gear, the work spindle is rotated on its axis and simultaneously a motion is imparted to the cradle 25. The rotation of the work spindle is effected by roll of the bevel gear segment 170 on the crown gear segment 172. The bevel gear segment 170 is adjustably secured by the bolts 173 to an arm 174 which is secured to a sleeve that is connected to the work spindle in known manner by the indexing mechanism, as shown, for instance, in the Bullock et al. patent above referred to. The crown gear segment may be made in two parts as shown in the Bullock et al. patent, but preferably will be of the swinging type as disclosed in my Patent No. 1,780,350 of November 4, 1930. The latter construction is shown in the drawings, the crown gear segment 172 being pivotally mounted by means of the pin 175 upon a bracket 176 (Figs. 1, 2 and 3) that is adjustably secured to the bed 20 of the machine by T-bolts 178.

In operation, the bed 28 is first moved toward the cradle to feed the grinding wheels into depth, then the cradle is rolled in one direction to cause the blank to be rolled past the grinding wheels, then the bed is withdrawn to withdraw the wheels from engagement with the work, then the cradle is returned to initial position, the blank being indexed on the return roll and then the cycle begins anew. The mechanism for imparting the alternate movements of feed and withdrawal to the carriage 28 will now be described.

Suitably mounted in the base or frame of the machine is a casting 180 (Figs. 3, 11 and 12) that is bored to receive the cylinder 181. The piston 182 reciprocates in this cylinder. This piston is connected by the nut 183 with a piston-rod 184. The piston rod 184 extends outwardly from the cylinder through a packing-box 185 of suitable construction which is mounted in the end plate 186 of the cylinder. The end plate 186 is held in position by bolts 187.

Figure 10:
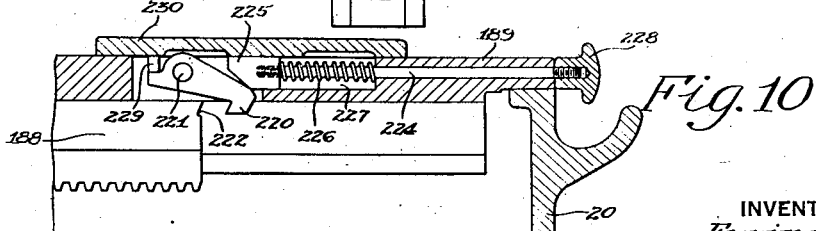
Figure 10 is a fragmentary sectional view taken through the frame or base of the machine and showing details of the movable stop normally limiting the withdrawal movement of the tool mechanism for indexing and showing the hand control for this stop.

Externally of the cylinder, the piston-rod 184 is connected to a rack 188 (Figs. 3, 9 and 10). This rack slides in a groove formed in a cover-plate 189 that is secured to the frame 20. The rack is held in position by straps 190. The rack meshes with a spur gear 192 which is secured to a shaft 193 that is suitably journaled in the base of the machine. There is a spur gear 194 secured to the shaft 193. This spur gear meshes with a spur gear 195 that, in turn, meshes with a spur gear 196. The two gears 195 and 196 are mounted on suitable studs in the base of the machine. The gear 196 meshes with a rack 197 that is secured to the under-face of the carriage 28. As the piston 182 reciprocates in the cylinder 181, then, a reciprocatory movement will be imparted to the bed 28.

Figure 12:
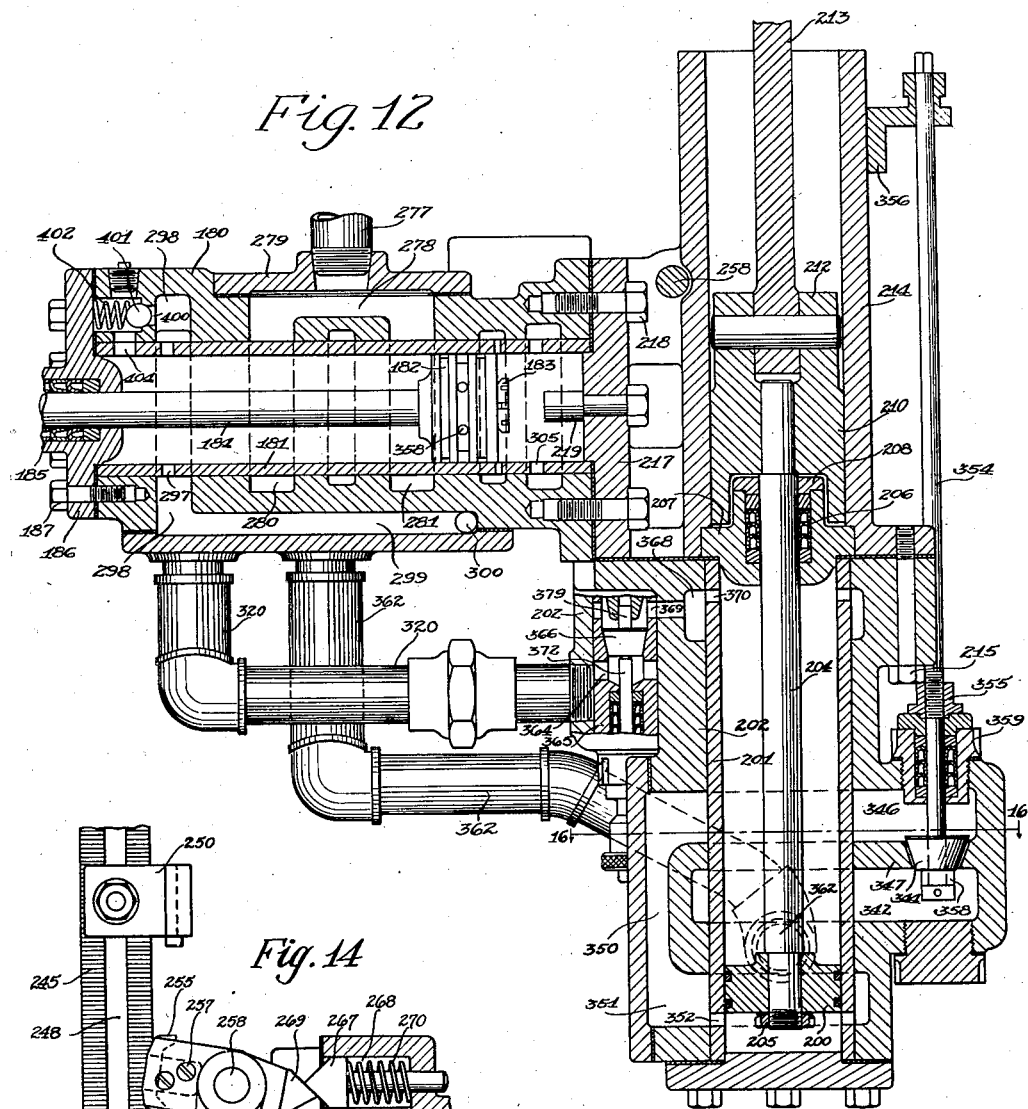
Figure 12 is a sectional view through this mechanism taken substantially on the line 12—12 of Figure 11.
Figures 13, 18:
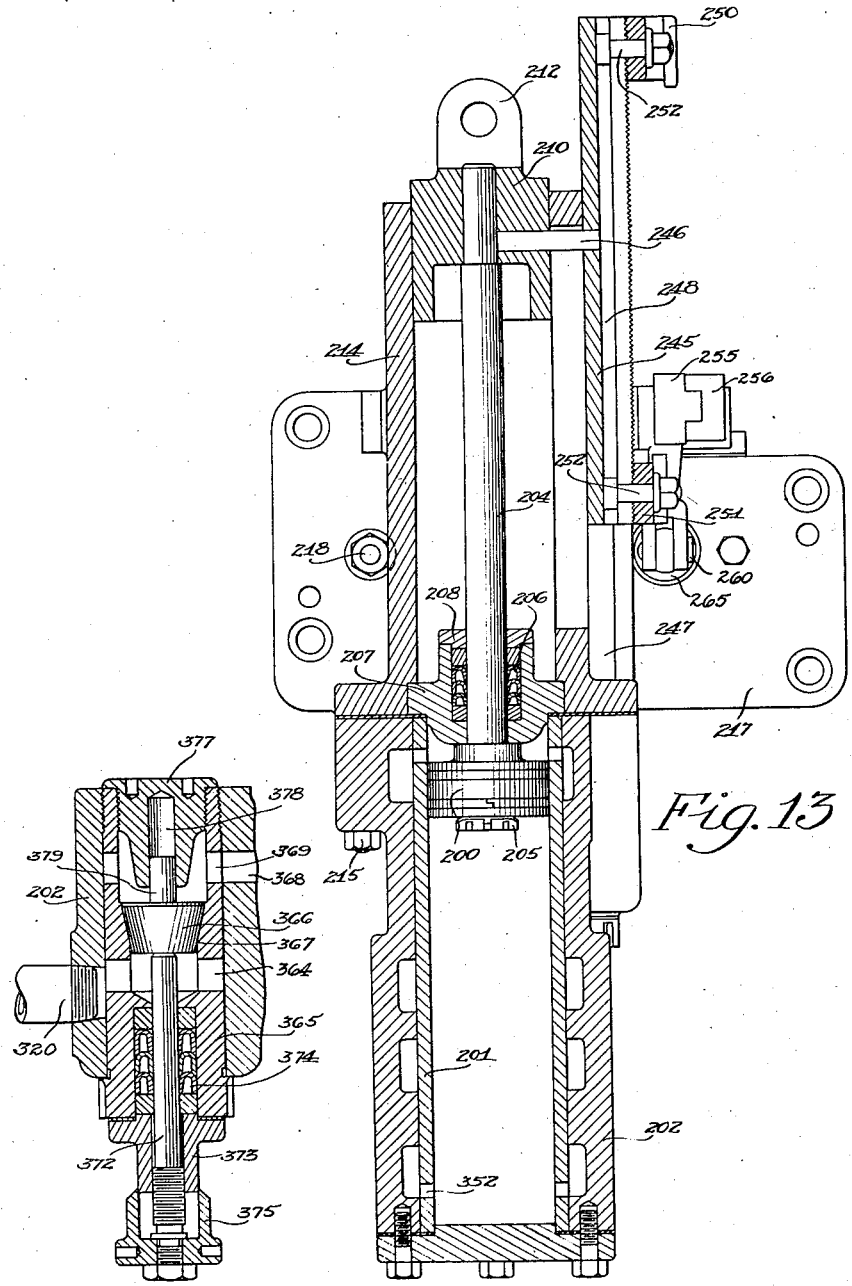
Figure 13 is a sectional view through the generating piston and cylinder and taken at right angles to the view of Figure 12.
Figure 18 is a vertical sectional view of one of the valves controlling the rate of generating roll of the machine.

Oscillation of the cradle 25 is effected by reciprocation of a piston 200 (Figs. 12 and 13). This piston slides in a cylinder 201 which is mounted in a bore of a casting 202. The cylinder 181 is horizontal, but the cylinder 201 is positioned diagonally in the base of the machine, as clearly shown in Figure 1.

Figure 11:
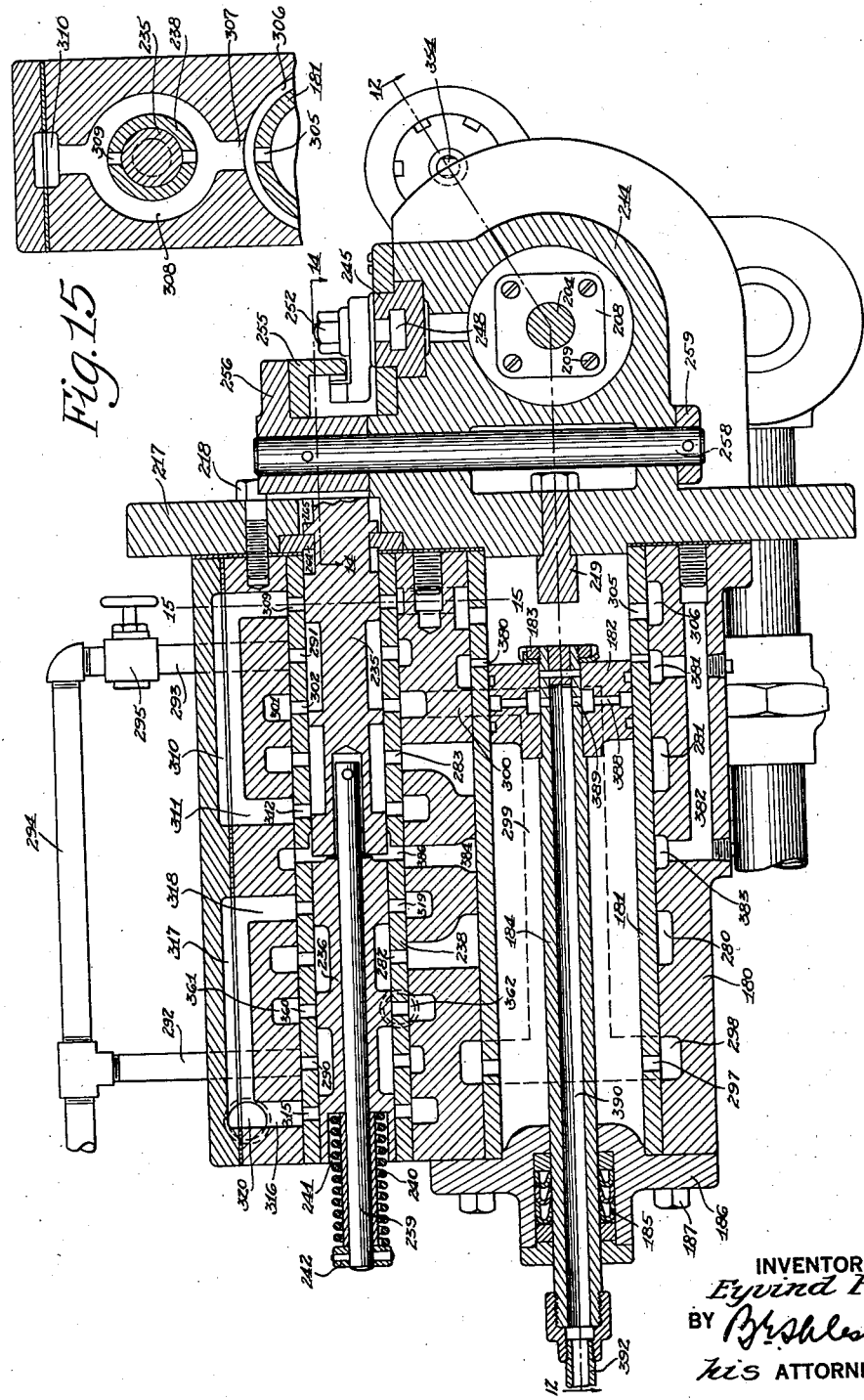
Figure 11 is a sectional view through the hydraulic control and operating mechanism of the machine.

There is a piston-rod 204 secured to the piston 200 by the nut 205. This piston-rod 204 extends upwardly through the stuffing-box 206 that is provided in the upper end-plate 207 of the cylinder 201. The cap 208 of the stuffing-box is secured in place by screws 209 (Fig. 11). There is an eared-head 210 secured by a pressed fit to the upper end of the piston rod 204. This head is connected to a link 213 which is, in turn, connected to the cradle 25 by the pin 211 (Fig. 1).

A cylindrical guide or sleeve 214 is provided for the sake of rigidity to guide the head 210 throughout its movement. The head 210 slides in the bore of this guide or sleeve 214. The guide 214 is secured to the casting 202 by bolts 215 and the sleeve 214 is formed at one side with an integral extension 217 which is bolted to the casting 180 by bolts 218. The extension 217 is shaped to form the inner end wall of the cylinder 181 and there is a stop-member 219 secured in this extension 217 and extending into the chamber of the cylinder 181 to provide a stop-limiting movement of the piston 182 in one direction. The movement of the piston 182 in the opposite direction is normally limited by a stop-dog 220 (Figs. 3 and 10). This dog is pivotally mounted by means of the pin 221 in the cover-plate 189 of the frame 20. The stop 220 has a hooked end which engages the end face of the rack 188, the hooked end of the stop-dog engaging in a suitable shaped recess 222 formed in the end face of the rack.

The stop-dog 220 is normally held in operative position by a spring-pressed plunger 224 whose head 225 is so shaped, as clearly shown in Figure 10, to have surface contact with the back of the stop-dog 220 when the latter is in operative position. The plunger 224 is normally urged into operative position by the coil-spring 226 which surrounds the plunger and which is interposed between the head 225 of the plunger and one end wall of a recess 227 in the cover-plate 189 in which the head 225 of the plunger slides. The head 225 of the plunger can be retracted from operative position, for a purpose hereinafter to be described, by pulling on the knob 228 which is threaded on the outer end of the plunger. The downward rocking movement of the stop-dog 220 is limited by a lug 229 which is formed integral with the cover-plate 189 and which is adapted to contact the tail of the stop-dog. Access to the plunger and stop-dog can be had by removing the auxiliary cover-plate 230 which is secured to the cover-plate 189 by screws (not shown).

Figure 19:
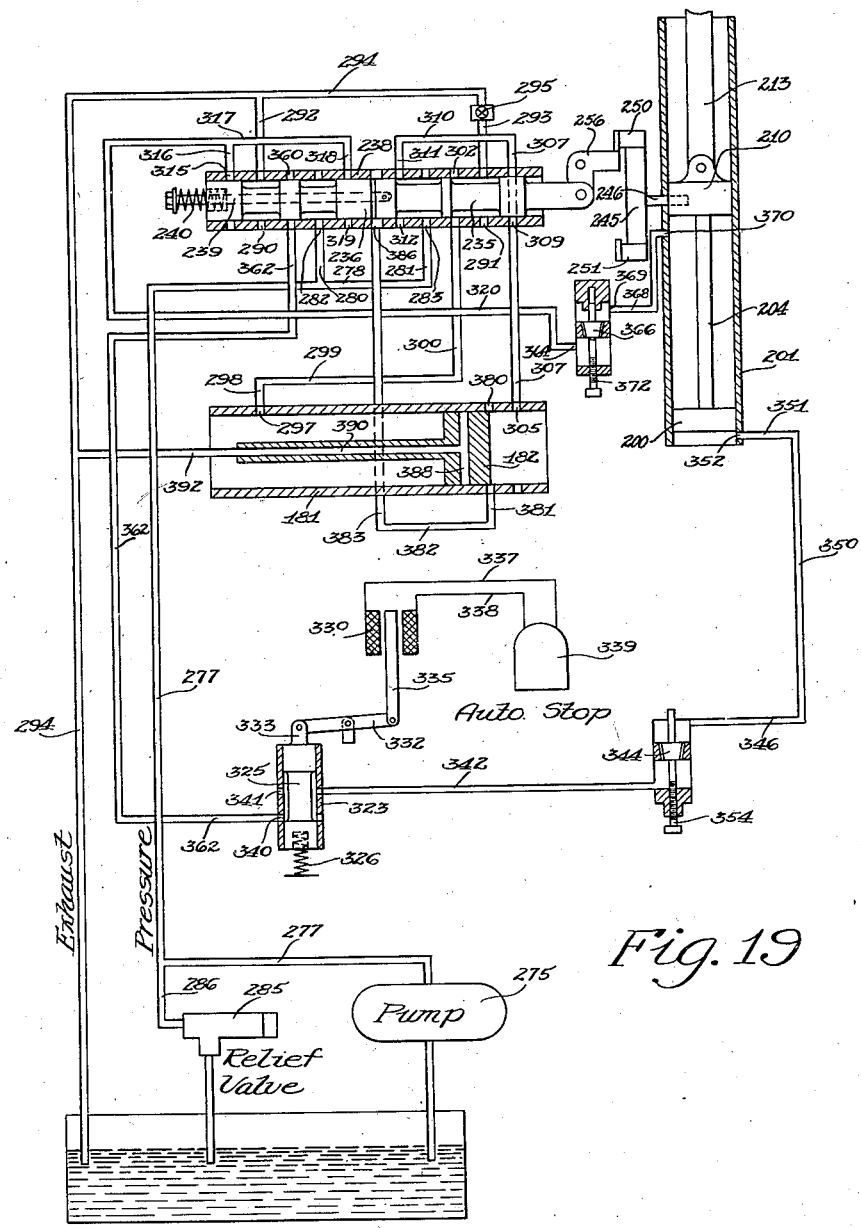
Figure 19 is a diagrammatic view of the hydraulic operating and control mechanism of the machine.

The movements of the pistons 182 and 200, that is, the movements of the bed 28 and cradle 25, respectively, are controlled, respectively, by two valves 235 and 236 (Figs. 11 and 19). These valves are mounted in alignment to slide in an elongated sleeve 238 that has a pressed fit in a bore in the casting 180. The two valves are movable relative to one another but are resiliently connected together by the rod 239 and spring 240. The rod 239 is pinned to the valve 235 and slides in the bore of the valve 236. The spring 240 surrounds the rod 239 and seats in a recess formed in the outer end of the valve 236. The spring is interposed between the end wall of this recess 241 and the head 242 which is pinned to the outer end of the rod 239. The two valves 235 and 236 are moved relative to one another by application of fluid pressure between the adjacent end faces of the two valves, as will be described more particularly hereinafter.

The valve 235 controls the movement of the piston 182, but the movement of this valve is controlled from the movement of the piston 200. There is a plate 245 (Figs. 3, 13 and 14) rigidly connected to the head 210 of the piston rod 204 by a pin 246. This plate 245 is T-shaped in cross-section and slides in a correspondingly shaped groove 247 in the sleeve 214, as the piston 200 reciprocates in the cylinder 201. There is a T-slot 248 cut longitudinally in the plate 245 and the front face of the plate is serrated at both sides of this T-slot as clearly shown in Figures 13 and 14. 250 and 251 designate, respectively, a pair of stops or dogs that are adjustably secured to the plate 245 by T-bolts 252 whose heads engage in the T-slot 248. The under surfaces of these dogs 250 and 251 are serrated to intermesh with the serrations of the plate 245 to hold the dogs securely in any position of adjustment on the plate.

As the piston 200 moves back and forth in the cylinder 201, the dogs 250 and 251 are brought alternately into engagement with a lug 255 (Figs. 14 and 11) that is secured by screws 257 to one arm of a bell-crank member 256. The bell-crank member 256 is pinned to a shaft 258 that is journaled in the casting 214 and held against axial movement therein by the washer 259 which is pinned to the shaft 258. The bell-crank member 256 is connected by a pin 260 with the stem 261 of the valve 235. The pin 260 engages in a slot 262 in the valve stem so that as the bell-crank member rocks, the valve 235 may be moved in a rectilinear direction without cramping. The valve stem extends outwardly through a cap-member 264 that closes one end of the chamber in which the valve 235 slides. Movement of the valve inwardly is limited by engagement of the collar 265 formed on the valve stem with the cap 264, while movement of the valve outwardly is limited by engagement of the valve itself with this same cap 264.

To make the movement of the valve 235, when shifted, sharp, and as nearly instantaneous as possible, a load and fire mechanism is provided. Thus, there is a spring-pressed plunger 267 mounted in a pocket 268 in the casting 180 and having a V-shaped outer end to engage a V-shaped lug 269 that is formed integral with the bell-crank member 256. The plunger 267 is pressed outwardly by the coil-spring 270 which surrounds the stem of the plunger and is interposed between the end wall of the pocket 268 and the head of the plunger. As soon as the bell-crank member 256 has been moved past center in one direction or the other by the dog 250 or the dog 251, as the case may be, the load and fire mechanism operates quickly throwing the bell-crank member on to the limit of its movement, thereby quickly shifting the valve 235.

The pressure fluid for actuating the hydraulically operated parts of the machine is pumped from a sump provided in the base of the machine. The pressure pump may be of any suitable construction and is not shown except diagrammatically in Figure 19, where it is designated at 275. The pump is driven by a motor 276 which is suitably mounted on one side of the frame of the machine (Figs. 2 and 3). A pipe-line 277 conducts the pressure fluid from the pump 275 to the duct 278 in the casting 180 (Fig. 12), the final section of the pipe-line 277 threading into a cover-plate 279 that is secured to the casting 180. The duct 278 communicates at its ends with ducts 280 and 281, respectively, that surround the cylinder 181 and lead, respectively, to the ports 282 and 283 in the sleeve 238 (Figs. 11 and 19). Both the ports 282 and 283 are arranged radially around the sleeve 238 and the ducts 280 and 281, respectively, surround the sleeve at spaced points along its length to communicate with the ports, respectively. A relief valve 285 is connected to the line 277 by a line 286 (Fig. 19). This relief valve may be of any suitable construction and is intended to prevent building up of pressure in the system beyond a desirable limit.

The motive fluid is exhausted from the sleeve 238 through two sets of radially arranged ports designated at 290 and 291, respectively. The ports 290 communicate with a pipe 292. The ports 291 communicate with a pipe 293, the two pipes 292 and 293 are connected together by a pipe 294 which leads back to the sump of the machine. There is a globe-valve 295 connected into the pipe-line 293. This valve may be of any known or suitable construction and is adjustable to control the rate of movement of the carriage 28, as will appear hereinafter.

On one side of the piston 182, the cylinder 181 is connected with the sleeve 238 through the ports 297 (Figs. 11, 12 and 19). These ports 297 lead into a duct 298 that surrounds the cylinder 181. The duct 298 communicates with a duct 299 that extends longitudinally of the cylinder 181 and leads into a duct 300. The duct 300 communicates with a duct or groove 301 that surrounds the sleeve 238 and has communication with the interior of the sleeve 238 through the radial ports 302 provided in this sleeve.

On the other side of the piston 182, the cylinder 181 is connected to the chamber in the sleeve 238 through the ports 305 in the wall of the cylinder. These ports 305 communicate with a groove or duct 306 that surrounds the cylinder 181 and leads into a duct 307 (Figs. 11 and 15), This duct 307 communicates with a cylindrical groove or duct 308 that surrounds the sleeve 238. The duct 307 connects with the chamber of the sleeve 238 through the radially arranged ports 309 in the sleeve. The groove 308 leads into a duct 310, which extends longitudinally of the sleeve 238. There is a duct 311 leading from the duct 310 and extending parallel to the duct 307. The duct 311 communicates with the radially arranged ports 312 in the sleeve 238.

The connections between the sleeve 238 and the cylinder 201 will now be described. There are a series of radially arranged ports 315 cut in the sleeve 238 near the outer end thereof. These ports communicate with a duct 316 that surrounds the sleeve 238 and leads into duct 317 that extends longitudinally of the sleeve. The duct 317 also communicates with the interior of the sleeve through the duct 318 and the ports 319 which lead from this latter duct and are formed in the sleeve 238. There is a pipe-line 320 leading from the duct 317 to the ports 364 (Figs. 12 and 18) of a sleeve 365 that is mounted in a suitable bore in the casting 202 and is threaded into this bore.

There is a tapered valve 366 mounted in the bore of the sleeve 365 and adapted to rest upon a correspondingly shaped seat formed in the bore of this sleeve. This valve 366 controls the amount of flow of the motive fluid between the pipe 320 and the duct 368. The latter duct communicates with the ports 369 in the sleeve 365 and also communicates with the ports 370 in the generating cylinder 201 (Figs. 12, 17 and 19).

The amount of opening of the valve 366 is controlled by adjustment of a rod 372 (Fig. 18) which threads into a nipple 373 that is secured to the lower end of the sleeve 365. The rod 372 extends through a packing-box 374 that is held in place in the sleeve 365 by the nipple 373 and the rod 372 contacts at its upper end with the bottom face of the valve 366. There is a cap-member 375 secured to the rod 372. The periphery of this cap member 375 is graduated at its upper edge so as to permit accurate adjustment of the amount of opening of the valve 366. When the line 320 is on pressure, the valve 366 is fully open, but when the line or duct 368 is on exhaust, the valve is pressed down on to its seat and is only open so far as is permitted by the adjustment of the rod 372. Thus, the rate of exhaust from the upper end of the cylinder 201 is controlled to control the rate of movement of the piston 200 upwardly. There is a guide member 377 threaded into the upper end of the sleeve 365. This member is bored as indicated at 378 to receive the stem 379 of the valve 366 and guide the valve in its movements.

The sleeve 238 is connected with the cylinder 201 on the lower side of the piston 200 through the ports 360 (Figs. 11 and 19) in the sleeve. These ports communicate with a cylindrical groove or duct 361 in the casting 180 that surrounds the sleeve 238. There is a pipe-line 362 leading from the duct 361. This pipe-line communicates with a groove or duct 322 (Fig. 17) formed in the casting 202 and surrounding the valve-sleeve 323 that has a pressed fit in a suitable bore in this casting. There is a slidable valve 325 mounted in the sleeve 323 and reciprocable therein.

Figure 17:
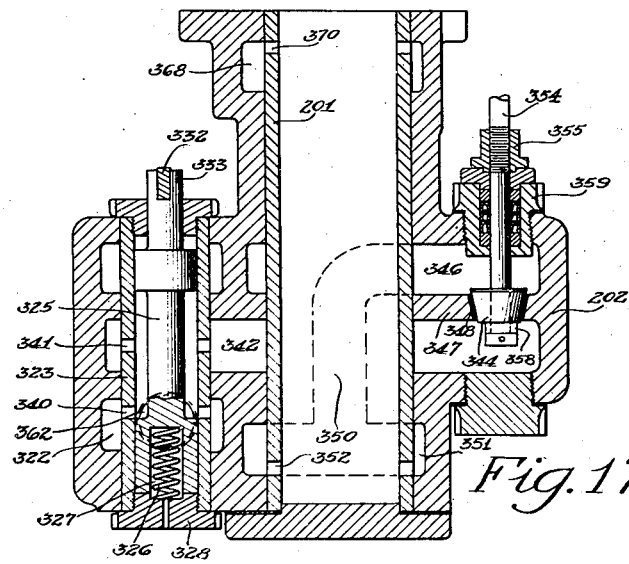
Figure 17 is a section on the line 17—17 of Figure 16, looking in the direction of the arrows.
Figure 16:
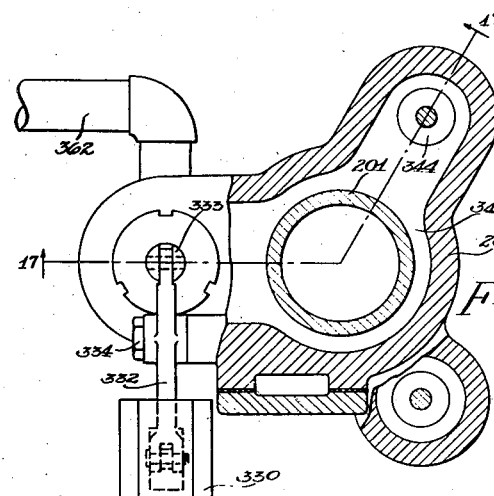
Figure 16 is a section on the line 16—16 of Figure 12 looking in the direction of the arrows.

The valve 325 is shaped as clearly shown in Figure 17. It is normally pressed upwardly by a coil-spring 326 which is seated in a recess in the bottom of the valve and is interposed between the top wall of the recess 327 and the inside face of a nut 328 that threads into the sleeve 323. The valve 325 is held in the depressed position shown in the drawings, during grinding of a gear, by action of a solenoid 330 (shown in Fig. 16 and indicated diagrammatically in Figure 19). The core bar of this solenoid is pivotally connected to a lever 332 which is pivotally mounted on the casting 202 and which is pivotally connected to the stem 333 of the valve 325. The stud 334 serves as a pivot for the lever 332 while it is pinned at opposite ends to the valve stem 333 and to the core-bar 335 of the solenoid.

The solenoid 330 is connected by the lines 337 and 338 (Fig. 19) with an automatic stop mechanism 339 that may be of any suitable construction and that, in turn, is so connected to a source of electrical power that the solenoid is energized during the grinding of a gear. When the last tooth of the gear has been ground, the stop mechanism is tripped, as will hereinafter be more fully described, breaking the connection to the solenoid releasing the core-bar 335 and allowing the valve 325 to be shifted from its lowermost position upwardly by action of the spring 326.

When the valve 325 is in the position shown in Figures 17 and 19, the motive fluid can flow from the duct 322 through the ports 340 in the sleeve 323 into the chamber of the valve 325. Thence, the motive fluid flows through the ports 341 in the sleeve 323 into a duct 342 which is of the shape clearly shown in Figure 16 and which surrounds the sleeve 323 and the cylinder 201, and leads to the port opening of an adjustable valve 344.

There is a duct 346 cored out in the casting 202 above the duct 342 and separated from the duct 342 by the wall 347 of the casting. The valve 344 is tapered and a correspondingly tapered seat 348 is provided for the valve in the partition wall 347.

When the valve is open, the motive fluid flows from the duct 342 into the duct 346. The latter duct leads into a duct 350 (Figs. 12 and 17) that communicates with a duct 351 which surrounds the cylinder 201 and communicates with the cylinder through the ports 352 in the cylinder-wall. The valve 344 is mounted to slide on a rod 354 which threads into a nut 355 and which extends upwardly along side the sleeve 214, being supported and guided at its upper end by a bracket 356 which is secured to one side of the sleeve 214. The valve 344 is adapted to rest on a disc 358 which is pinned to the lower end of the rod 354. The nut 355 is secured to a member 359 which threads into the casting 202 and in which there is mounted a suitable stuffing box through which the rod 354 passes. The upper end of the rod 354 is formed with a hex-head so that the rod can be rotated by a wrench to adjust the amount of opening of the valve 344. When the duct 342 is on pressure, the valve opens full sliding on the rod 354, but when the duct 346 is on exhaust, the rate of exhaust through this duct, that is, the rate of down-roll of the cradle, is controlled by the amount of opening of the valve 344 which is adjustable as just described.

Besides the series of ports 297 and 305 in the cylinder 181, there is another series of ports 380 cut radially in this cylinder, (Figs. 11 and 19). These ports 380 communicate with a groove or duct 381 that surrounds the cylinder 181 and leads into a duct 382. The duct 382 communicates with a duct 383 that surrounds the cylinder 181 (Figs. 11, 12 and 19) and leads into a duct 384. The duct 384 communicates with the ports 386 in the sleeve 238. These ports are located at a point to admit the pressure fluid or exhaust it from between the valves 235 and 236. When the pressure fluid is admitted between the valves, the two valves are spread apart. When the motive fluid is exhausted from between the valves, they are forced together again by the action of the spring 240.

There are a series of radially arranged cuts 388 drilled in the piston 182 (Figs. 11 and 12). These communicate with ports 389 drilled in the piston rod 184. The piston rod 184 is hollow, providing a duct 390 that is connected by the flexible hose 392 with the line 294 which leads back to the sump of the machine.

In use, the various adjustable parts of the machine are adjusted as appropriate for the gear which is to be ground. Thus the arms 45 are adjusted angularly on the column 40 in accordance with the angle of convergence of the sides of the teeth of the bevel gear to be ground and the plates 55 are adjusted on the slides 50 in accordance with the thickness of the teeth to be ground. Also, the slides 50 are adjusted longitudinally on the arms 45 and the column 40 is adjusted laterally on the supporting plate 30 as determined by the cone-distance of the gear to be ground. The throw of the crank 134 is adjusted in accordance with the face width of the gear to be ground. The supporting plate 30 is adjusted angularly on the bed or carriage 28 in accordance with the dedendum angle of the gear to be ground if it is desired that this gear be ground conjugate to a true crown gear. If the gear is to be ground, however, conjugate to a nominal crown gear, the supporting plate 30 is set at zero. The work head is adjusted on the work head carrier to adjust the gear to the correct cone distance and the work head carrier is adjusted angularly on the cradle in accordance with the pitch cone angle of the gear to be ground. When the segments are made according to the principles of my prior patent above mentioned, a segment 170 will be selected whose pitch angle corresponds to the pitch cone angle of the gear to be ground. The dogs 250 and 251 (Figs. 13 and 14) are adjusted on the plate 245 a distance apart determined by the amount of roll which it is desired to impart to the cradle. The grinding wheels are dressed in accordance with the pressure angles of the side tooth surfaces to be ground on the gear. They are also adjusted that when in full depth position, their tips will operate in the root plane of the gear. This last adjustment is effected by rotation of the screws 68 (Figs. 6 and 8) through manipulation of the handles 76. The valves 344 and 366 (Figs. 12 and 18) are also adjusted by rotation of the rods 354 and 372, respectively, to control the rates of roll of the cradle in opposite directions. The valve 295 is adjusted to control the rate of movement of the carriage 28.

When all of the adjustments have been made, the machine is started. At this time, the bed 28 is in full withdrawn position. The first movement is an idle up-roll of the cradle as will hereinafter be more fully described. Then the feed movement begins. The bed 28 moves inwardly, carrying the wheels into depth. When full depth position is reached, the down-roll of the cradle begins. In this movement of the cradle, the profiles of a pair of tooth surfaces of the gear are rolled across the rotating and reciprocating grinding wheels. At the end of the down-roll, two tooth profiles will have been fully ground. Then the cradle stops and the withdrawal movement of the carriage 28 begins. This withdrawal movement carries the wheels clear of the gear. When the wheels are clear, the carriage-movement is stopped and the up-roll of the cradle begins. During the up-roll, the work is indexed. At the end of the up-roll, the cradle is again stopped and the cycle begins anew with the grinding wheels fed into the gear so as to grind a new pair of tooth surfaces.

The valves 235 and 236 and the pistons 182 and 200 are shown in Figures 11, 12 and 19 in the positions which they occupy when the carriage 28 has almost finished a withdrawal movement, while in Figure 13 the piston 200 is shown in the position which it occupies at the end of the indexing up-roll of the cradle.

I shall describe the sequence of operations beginning with the positions of the parts shown in Figures 11, 12 and 19. At this time, the cradle is stationary in its lowermost position for with the valve 236 occupying the position shown in the drawings, flow of the pressure fluid to the lower end of the cylinder 201 is shut off and discharge of the exhaust fluid from the upper end of the cylinder 201 is shut off. The piston 182 is, however, being forced to the left in Figures 11 and 19 in its withdrawal movement for the pressure fluid is flowing from the ports 283 in the sleeve 238 through the ports 312 in this sleeve, the ducts 311 and 310 and around the valve 235 through the duct 307 and through the ports 305 into the cylinder 181 at the right end of the same. During the movement of the piston 182 to the left, fluid exhausts from the left end of the cylinder 181 through the ports 297, the ducts 298, 299, 300 and 301, the ports 302 and 291 in the sleeve 238, and the lines 293 and 294 back to the sump, the rate of movement of the piston 182 being determined by the setting of the globe-valve 295.

Toward the end of its leftward movement, the piston 182 will clear the ports 380 in the cylinder 181, allowing the pressure fluid to flow from the ports 305 through the ports 380. In Figures 11, 12 and 19, the piston 182 is shown just at the point where it is beginning to clear the ports 380. As soon as the ports 380 begin to open, the pressure fluid flows through the ducts 381, 382, 383 and 384, and the ports 386 in the sleeve 238 in between the valves 235 and 236. Since the spring 240 is compressible by relative movement between the valves 235 and 236 and since the valve 235 is held in its left position shown in Figures 11 and 19 by the spring 240 (Figs. 14 and 11), the pressure fluid forces the valve 236 further to the left from the position shown in these figures and against the resistance of the spring 240.

Just before the valve 236 will have moved fully to the left, the leftward movement of the piston 182 will be stopped by engagement of the stop-dog 220 (Fig. 10) with the rack 188. In its movement to the left, the valve 236 will open the ports 315 and 360 of the valve-sleeve 238.

The pressure fluid now flows from the ports 282 through the ports 360, the line 362 (Figs. 12, 17 and 19) and the ports 340 into the chamber of the valve 325. Thence, the pressure fluid flows through the ports 341 into the duct 342 (Figures 12, 16, 17 and 19). The pressure of the motive fluid opens the valve 344 fully, the valve sliding upwardly on the rod 354. The pressure fluid flows, then, through the open valve into the duct 346 whence it flows through the ducts 350 and 351 and the ports 352 into the lower end of the cylinder 201 to force the piston 200 upwardly in this cylinder to effect the indexing up-roll of the cradle. At this time, fluid is exhausted from the upper end of the cylinder 201 through the ports 370, the duct 368 and the ports 369 (Figs. 12, 18 and 19) into the sleeve 365 which houses the valve 366. The rate of flow of the exhaust fluid between the valve 366 and its seat 367 is determined by the adjustment of the rod 372 made when setting-up the machine. The exhaust fluid flows through the valve from the ports 369 to the ports 364 whence it returns through the line 320, the duct 316 (Figs. 11 and 19), the ports 315 and 290 in the sleeve 238, and the lines 292 and 294 back to the sump.

During the up-roll of the cradle, the index mechanism is operated, being tripped and actuated by the roll of the segment 170 on the crown gear segment 172, as in the index mechanism of the Bullock et al. patent above mentioned and commonly in index mechanisms of the notched plate type such as used on various bevel gear cutting and grinding machines well known in the art.

Figure 14:
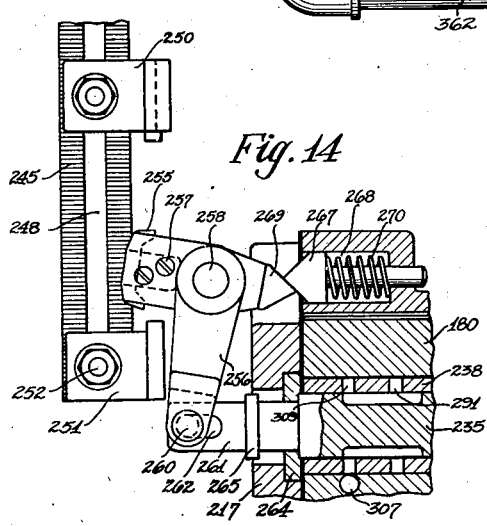
Figure 14 is a fragmentary sectional view on the line 14—14 of Figure 11, looking in the direction of the arrows and showing details of the adjustable trip mechanism for the feed control valve.

Toward the end of the up-roll of the cradle, the dog 251 carried by the plate 245 engages the lug 255 carried by the projecting arm of the bell-crank 256 and as the piston 200 bottoms in the cylinder 201 (Fig. 13), the bell-crank is rocked upwardly, swinging the lug 269 (Fig. 14) past center and through action of the load and fire mechanism shifting the valve 235 from the position shown in Figures 11 and 19 to the position shown in Figure 14. The ports 302 (Figs. 11 and 19) are now put on supply from the ports 283 and the pressure fluid flows from the ports 302 through the ducts 301, 300, 299 and 298, and the ports 297 into the left end of the cylinder 181. This forces the piston 182 toward the right in the cylinder to move the bed 28 inwardly through operation of the rack 188 and gears 192, 194, 195, 196 and rack 197 (Fig. 9) to feed the grinding wheels into depth. During this movement, fluid exhausts from the right end of the cylinder 181 through the ports 305, the duct 307, ports 309 and 291, and the lines 293 and 294 back to the sump. As before, the rate of movement of the piston 182 is determined by the setting of the glode-valve 295.

At this time, as described, the valve 235 is at the right limit of its movement in the sleeve 238, occupying the position shown in Figure 14. During the first part of the movement of the piston 182 to the right, part of the fluid between the valves 235 and 236 is exhausted, flowing through the ports 386, the ducts 384, 383, 382, 381 and ports 380 into the cylinder 181 whence it flows back to the sump through the ports 305. As the fluid exhausts from between the valves 235 and 236, the valve 236 shifts to the right under actuation of the spring 240. Before the valve 236 has shifted fully over to the right, however, the ports 380 are shut off by the piston 182 in its movement to the right. But the piston 182 again clears the ports 380 just before the piston 182 reaches the end of its feed movement to the right and the remainder of the fluid between the valves 235 and 236 is allowed to exhaust from between the valves 235 and 236 through the ports 386, ducts 384, 383, 382, and 381, the ports 380 in the cylinder 181, the ducts 388 in the piston 182, the ports 389 in the piston-rod 184, the duct 390 in this piston-rod, and the hose 392 to the pipe 294, returning thence to the sump. The valve 236 is, therefore, shifted fully over to the right by action of the spring 240 to abut against the valve 235 which is already, as described, fully over to the right. The inward feed movement of the piston 182 is stopped by abutment of the piston rod 184 against the positive-stop 219 (Fig. 12).

With the valve 236 fully over to the right, the pressure fluid flows from the ports 282 in the sleeve 238 through the ports 319 in this sleeve, the ducts 318 and 317, the line 320 (Figs. 11, 14, 18 and 19), and the ports 364 into the chamber of the valve 366. This valve will be forced fully open by the pressure of the pressure fluid. Thus the pressure fluid will be free to flow through the ports 369 in the sleeve 365, the duct 368, and the ports 370 in to the upper end of the cylinder 201, forcing the piston 200 downwardly in this cylinder to rock the cradle downwardly to produce the generating roll. At this time, fluid exhausts from the lower end of the cylinder 201 through the ports 352 the ducts 351, 350 and 346, through the opening between the valve 344 and its seat 348, through the duct 342 (Figs. 14, 17 and 19), the ports 341 and 340 in the sleeve 323, the line 362, ports 360 and 290 in the sleeve 238 (Figs. 11 and 19), the lines 292 and 294 to the sump. The rate of down roll of the cradle is determined by the setting of the valve 344. During the whole of the down-roll of the cradle, the carriage 28 is stationary, the piston 182 being held against the positive stop 219 (Fig. 11), by pressure of the motive fluid on the left end of this piston.

By appropriate setting of the rods 372 and 354 (Figs. 18 and 12), the movement of the generating piston 200 can be controlled so that the cradle will have a slow generating downroll and a comparatively rapid return roll.

Just before the end of the down-roll of the cradle, the dog 250 strikes the lug 255 carried by the projecting arm of the bell-crank 256 (Figs. 14 and 19) and as the piston 200 moves to the limit of its downward movement, the bell-crank 256 is rocked through operation of the dog 250 and the load and fire mechanism, from the position shown in Figure 14, shifting the valve 235 to the left to the position shown in Figures 11 and 19. In this movement of the valve 235, the valve 236 is also carried to the left without compressing the spring 240 for the two valves at this time are in abutting engagement. The movement of the valve 236 to the left stops the movement of the cradle for the ports 315, 360 and 319 are all shut off and the motive fluid neither flows to nor exhausts from the cylinder 201.

The movement of the valve 235 to the left, however, puts the right end of the cylinder 181 on supply, the pressure fluid flowing from the ports 283 to the ports 312, the ducts 311, 310 and 307, and the ports 305 into the right end of the cylinder 181. Thus, the carriage 28 is moved rearwardly to withdraw the grinding wheels from engagement with the gear being ground. At this time, the fluid exhausts from the left end of the cylinder 181 through the ports 297, the ducts 298, 299, 300, 301, the ports 302 and 291 and the lines 293 and 294 to the sump. As the piston 182 moves to the left, it opens the ports 380, supplying pressure fluid through the ducts 381, 382, 383 and 384, and the ports 386 between the valves 235 and 236 to cause the valve 236 to be separated from the valve 235 and moved further to the left against the resistance of the spring 240. The piston 182 is shown in Figures 11 and 19 in the position where it has just begun to clear the ports 380 and as the sequence of operations of the hydraulic mechanism from this point has already been described, it need not be repeated here.

The operations proceed in proper sequence, the carriage being fed into depth, the cradle being rolled downwardly for generation of the tooth profiles, the carriage being withdrawn and the cradle being rolled upwardly to index the gear until all of the teeth of the gear have been ground. Then the automatic stop mechanism 339 (Fig. 19) is tripped to de-energize the solenoid 330. Immediately thereafter, the valve 325 (Figs. 17 and 19) is shifted upwardly by action of the spring 326. This shuts off the connection between the duct 342 and line 362 through the ports 341 and 340 of the sleeve 323. The automatic stop 339 is tripped when the piston 182 is moving to the left to withdraw the grinding wheel from engagement with the gear after grinding the last pair of tooth surfaces of the gear. The line 342 to the cylinder 201 of the generating piston 200 is, therefore, shut off with the generating piston in its lower position, the position shown in Figures 12 and 19.

To remove a completed gear and chuck a new work-piece, the operator pulls outwardly on the knob 228 (Figs. 10 and 3). This disengages the head 225 of the plunger 224 from the stop-dog 220. The right end of the cylinder 181 is already on supply. Since the dog 220 is no longer held positively in operative position, the pressure of the fluid on the right end of the piston 182, operating through the rack 188, will force the stop 220 upwardly out of the way and allow the piston 182 to move fully to the left in the cylinder 181, withdrawing the carriage 28 fully from operative position. The last part of this movement is cushioned, for the ports 297 through which the fluid exhausts from the left end of the cylinder 181 are a slight distance inwardly from the left end of this cylinder and, therefore, a slight head of the motive fluid is entrapped between the piston 182 and the end plate 186 of the cylinder.

While removing the completed gear and chucking a new work-piece, the operator may stop the machine for safety. When the machine is re-started, the solenoid 330 is re-energized and the valve 325 (Figs. 17 and 19) is returned to the position shown in the drawings against the resistance of the spring 326. This opens the connection between the duct 342 and the line 362. The first operation of the machine after re-starting is an up-roll of the cradle. This is an idle movement with an idle indexing operation and is necessary simply that the parts may resume their operations in proper sequence. At the end of the up-roll of the cradle, the dog 251 engages the bell-crank 256 (Figs. 14 and 19) to shift the valve 235 from the position shown in Figures 11 and 19 to the position shown in Figure 14, as already described. This puts the ports 302 on supply and the pressure fluid flows through the ducts 301, 300, 299 and 298 (Figs. 11 and 19). At this time, the piston 182 is at its extreme leftward position in the cylinder 181 and so the ports 297 are shut off. The motive fluid flows, however, from the duct 298 into the duct 400 (Fig. 12) forcing open the ball-check valve 401 against the resistance of the spring 402. The pressure fluid can, therefore, flow through the open valve and the ports 404 into the left end of the cylinder 181. Thus the piston 182 is forced back to the right returning the grinding wheels to operative position.

As the piston 182 moves back to the right, the dog 220 (Fig. 10) drops down again behind the rack 188 through operation of the spring-pressed plunger 224, thus re-establishing the limit of withdrawal movement of the bed 28 for indexing. The machine now operates, as before, to grind the new gear.

While the invention has been described in connection with a machine for grinding straight bevel gears, it will readily be understood that it has much wider application. Thus, through slight changes, a machine of substantially the same construction as that shown, might be used to cut straight bevel gears by use of a pair of planing tools instead of grinding wheels. The invention, in fact, is applicable broadly to machines for generating bevel or hypoid gears and even spur gears, whether straight or curved tooth. The interlocking of the mechanisms for producing the feed and generating movements is a feature of value on any type of generator whether it be bevel, hypoid or spur. Likewise, the control of the rates of generating and return rolls through use of separately adjustable control valves is a feature which might be of advantage on any type of generating machine. Certain other features, such as the mounting of the tool slides on anti-friction bearings have wide application, also, and may be used on any machine employing reciprocating tools whether of the generating or forming types.

In general, it may be said that while a preferred embodiment of the invention has been described, the invention is capable of various further modifications and uses, and this application is intended to cover any variations, uses, or adaptations of the invention, following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. In a machine for producing gears, an oscillatory cradle, a carriage movable toward and from the cradle, a tool support mounted on one of said parts and a work support mounted on the other, a segment having a fixed relation to the tool mechanism, a segment connected to the work support and meshing with the first segment, fluid pressure operated means for oscillating the cradle, fluid pressure operated means for reciprocating the carriage to feed the tool mechanism into and out of cutting depth, means for actuating the tool mechanism to effect the cutting operation, and means controlling the operation of said two fluid pressure operated means so that the cradle is stationary while the carriage is moving and the carriage is stationary while the cradle is moving and each completes its movement in one direction before the movement of the other begins, and means for indexing the work support during movement of the cradle in one direction.

2. In a machine for producing gears, a carrier, a carriage movable toward and from the carrier, a tool support mounted on one of said parts and a work support mounted on the other, tool mechanism mounted on the tool support, means for reciprocating the carriage comprising a cylinder and a piston reciprocable therein, means for reciprocating the carrier comprising a cylinder and a piston reciprocable therein, means for rotating the work support on movement of the carrier, means for periodically indexing the work support, a pair of reverse valves controlling, respectively, the directions of application of fluid pressure to said pistons, means operable at the opposite limits of movement of the first piston for reversing the valve which controls the direction of application of fluid pressure to the second piston, and means operable at the opposite limits of movement of the second piston for reversing the valve which controls the direction of application of fluid pressure to the first piston.

3. The combination with a pair of cylinders and a pair of pistons reciprocable, respectively, in said cylinders, of a pair of aligned reciprocable valves for controlling, rsspectively, the movements of said pistons, means normally urging said valves into abutting engagement, means operable on movement of one piston in opposite directions, respectively, for admitting fluid pressure between and exhausting it from between said valves to cause said valves to be separated and allow them to return into abutting engagement on movement of said piston in opposite directions, respectively, and means operable on movement of the other piston in opposite directions, respectively, to move both valves bodily together in opposite directions.

4. In a machine for producing gears, an oscillatory cradle, a carriage movable toward and from the cradle, a work support mounted on one of said parts, a tool support mounted on the other and adjustable thereon about an axis perpendicular to the axis of the cradle, a pair of tool slides reciprocable on said tool support in converging paths, a tool mounted on each tool slide, means for oscillating the cradle, means for rotating the work support on oscillation of the cradle to effect generation of the tooth profiles, means for actuating said carriage to feed the tool into and out of cutting depth, and means for reciprocating said tool slides to effect the cutting operation.

5. In a machine for producing gears, an oscillatory cradle, a carriage movable toward and from the cradle in a direction parallel to the axis of the cradle, a work support mounted on one of said parts, a tool support mounted on the other and adjustable thereon about an axis perpendicular to the axis of the cradle, a crown gear segment, a tapered gear segment connected to the work support and rotatable on the crown gear segment on oscillation of the cradle, a pair of tool slides reciprocable on said tool support in converging paths, a tool mounted on each slide, means for oscillating the cradle, means for actuating said carriage to feed the tool into and out of cutting depth, and means for reciprocating the tool slides to effect the cutting operations.

6. In a machine for grinding straight bevel gears, a frame, a cradle mounted on the frame for oscillation about a horizontal axis, a work support rotatably mounted on the cradle, a bed mounted on the frame for movement toward and from the cradle, a pair of arms adjustable angularly on said bed about a common axis, a pair of tool slides carried by said arms and reciprocable thereon in converging paths, a grinding wheel journaled on each of said slides, a segment mounted on the frame, a second segment connected to the work support and meshing with the first segment, means for oscillating said cradle, means for actuating said bed, means for reciprocating said slides, and means for rotating said grinding wheels.

7. In a machine for producing gears, a carrier movable alternately in opposite direction to produce relative rolling movement between the tool mechanism and the work, a carriage movable alternately toward and from the carrier, a tool support mounted on one of said parts and a work support mounted on the other, a cylinder and a piston reciprocable therein, one of which is fixed and the other of which is connected to said carrier, a second cylinder and a second piston reciprocable in said second cylinder, one of the two last-named parts being fixed and the other being connected to said carriage, a pair of valves controlling, respectively, the direction of application of fluid pressure to the two pistons, and means whereby each piston operates the valve controlling the movement of the other piston.

8. In a machine for producing gears, a tool support, a work support, means for producing relative rolling movements in opposite directions between the tool and work supports, means for producing relative movements of feed and withdrawal between the tool and work supports, means for indexing the work support during the periods of withdrawal, and means for interlocking said first two means so that operation of one is controlled by operation of the other.

9. In a machine for producing gears, a tool support and a work support, an oscillatory cradle upon which one of said supports is mounted, a work spindle journaled in the work support, means for rotating the work spindle on oscillation of the cradle, means for reciprocating one of said supports to produce alternate movements of feed and withdrawal between the tool and work supports comprising a cylinder and a piston reciprocable therein, means for indexing the work spindle during the periods of withdrawal, means for oscillating the cradle comprising a cylinder and a piston reciprocable therein, separate reverse valves controlling the directions of movement of the reciprocable support and of the cradle, respectively, and means whereby the second piston operates the valve governing the movement of the reciprocable support.

10. In a machine for producing gears, a tool support and a work support, an oscillatory cradle upon which one of said supports is mounted, a work spindle journaled in the work support, means for rotating the work spindle on oscillation of the cradle, means for reciprocating one of said supports to produce alternate movements of feed and withdrawal between the tool and work supports comprising a cylinder and a piston reciprocable therein, means for indexing the work spindle during the periods of withdrawal, means for oscillating the cradle comprising a cylinder and a piston reciprocable therein, separate reverse valves controlling the directions of movement of the reciprocable support and of the cradle, respectively, and means whereby the movement of the first piston operates the valve governing the movement of the cradle.

11. In a machine for producing gears, a tool suport and a work support, an oscillatory cradle upon which one of said supports is mounted, a work spindle journaled in one of said supports, means for rotating the work spindle on oscillation of the cradle, means for reciprocating one of said supports to produce alternate movements of feed and withdrawal between the tool and work supports, comprising a cylinder and a piston reciprocable therein, means for oscillating the cradle comprising a cylinder and a piston reciprocable therein, means for indexing the work spindle during the periods of withdrawal, reverse valves controlling the directions of movement of the cradle and reciprocable support, respectively, adjustable trip members connected to one of the pistons for reversing the valve which controls the movement of the other piston and means whereby the latter piston in its movement reverses the valve which controls the movement of the other piston.

12. In a machine for producing gears, a work support, a tool support, a reciprocable carriage upon which one of said supports is mounted, means for reciprocating said carriage, a cradle upon which one of said supports is mounted, means for reciprocating the cradle comprising a cylinder and a piston reciprocable therein, means for applying fluid-pressure alternately to opposite sides of said piston to effect movement of the cradle in opposite directions, and means operated by the piston at opposite ends of its movement for rendering said carriage-reciprocating means operative.

13. In a machine for producing gears, a work support, a tool support, a reciprocable carriage upon which one of said supports is mounted, a cradle upon which one of said supports is mounted, means for oscillating the cradle, means for reciprocating the carriage comprising a cylinder and a piston reciprocable therein, means for applying fluid-pressure alternately to opposite sides of said piston to alternately feed said carriage into and withdraw it from operative position, means for indexing the work spindle during the periods of withdrawal, and means operated by the piston during its movement for controlling the operation of the cradle operating means.

14. In a machine for producing gears, a tool support, a work support, fluid-pressure operated means for producing relative rolling movements in opposite directions between the tool and work supports, fluid-pressure operated means for producing relative movements of feed and withdrawal between the tool and work supports, means for indexing the work support during the periods of withdrawal, separate valves controlling the operation of said two fluid-pressure operated means, and means whereby each fluid-pressure operated means controls the valve that controls the operation of the other fluid-pressure operated means.

EYVIND FINSEN.